Jan. 4, 1927.

J. L. MEGATHLIN 1,613,523

EMERGENCY BOILER TUBE PLUG

Filed May 19, 1924

Inventor:
J. L. MEGATHLIN,
By
Attorney.

Patented Jan. 4, 1927.

1,613,523

UNITED STATES PATENT OFFICE.

JESSE L. MEGATHLIN, OF MIAMI, FLORIDA.

EMERGENCY BOILER-TUBE PLUG.

Application filed May 19, 1924. Serial No. 714,407.

The present invention relates to joints between tubes and sheets, such as used in boilers, and aims to provide a device, to be used in an emergency, for stopping a leak between the end of a tube and the sheet or wall in which the end of the tube is secured.

Another object is the provision of an emergency boiler tube plug which can be inserted in the end of the tube and operated to expand the tube in the opening of the sheet for stopping a leak in a simple, convenient and facile manner.

A further object is the provision of a device comprising a novel construction and assemblage of the component elements, whereby the device is practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
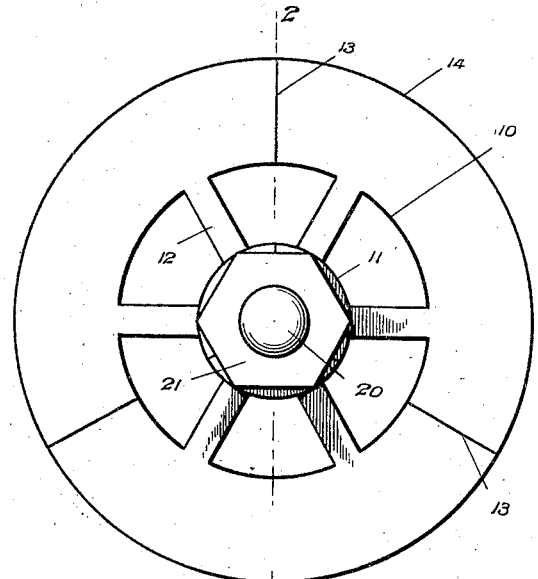
Figure 1 is a front view of the improved plug.
Figure 3:
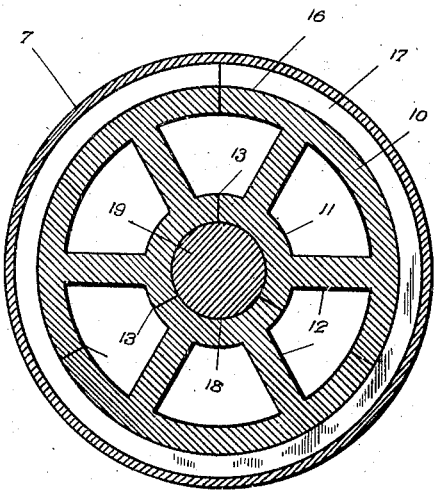
Fig. 3 is a cross section on the line 3—3 of Fig. 2.
Figure 2:
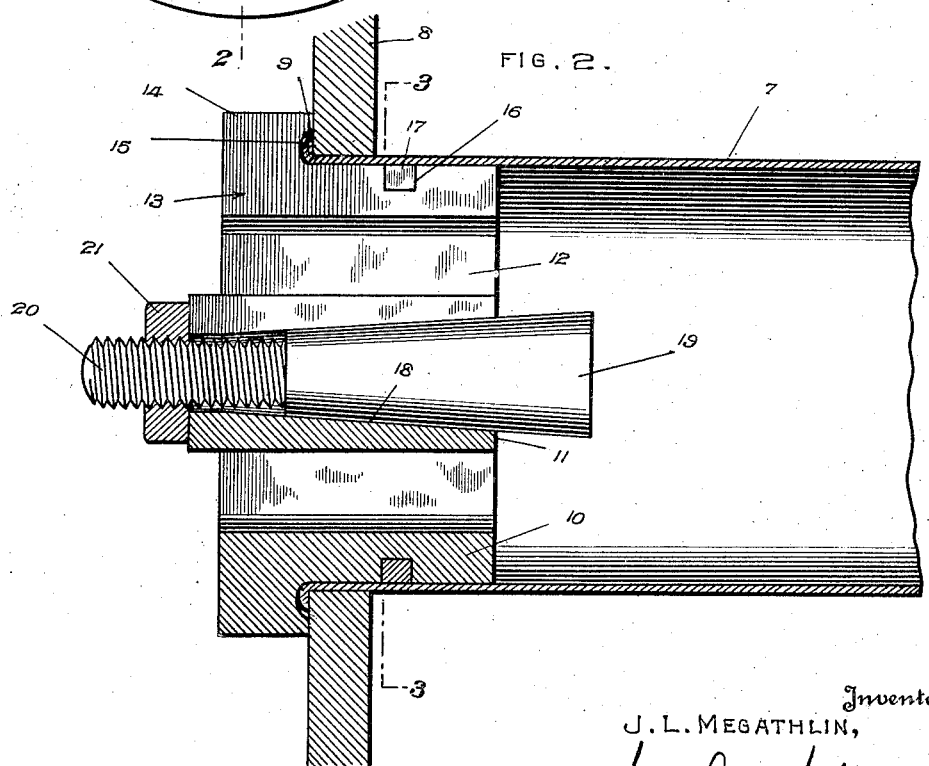
Fig. 2 is a diametrical section on the line 2—2 of Fig. 1.

In the drawing there is shown a tube 7 having one end extending through an opening in the sheet or wall 8 and beaded or swaged, as at 9, in accordance with the usual practice in boiler construction.

The plug comprises the rim 10, hub 11 and radial spokes or webs 12, thereby providing openings extending longitudinally through the plug, through which the products of combustion, gas or other fluid passes without interruption, when the plug is inserted in the end of the tube. The plug is divided radially into sections (three as shown), and the divisions 13 are located midway between the adjacent or corresponding webs 12.

At its outer end the rim 10 has an outstanding annular flange or collar 14 forming a shoulder to abut the sheet 8, said shoulder being grooved, as at 15, to receive said bead, when the plug is inserted into the tube.

In order to hold the sections of the plug assembled as a unit, the rim 10 has an annular circumferential groove 16 in which a split circular spring 17 is fitted.

The hub 11 has a tapered hole 18 extending longitudinally therethrough, with the larger end of the hole at the inner end of the plug, and a tapered pin 19 is fitted in said hole, and has a threaded stem 20 at its outer smaller end projecting beyond the outer end of the hub. A nut 21 is threaded on the stem 20 and seats against the outer end of the hub 11, so that when the nut is tightened the pin 19 is drawn outwardly into the hub 11, thereby expanding the plug by separating the sections thereof.

A leak between the tube and sheet can be stopped, even when there is low pressure in the boiler. Thus, the pin 19 is adjusted to permit the sections of the plug to fit together, thereby permitting the plug to be inserted in the end of the tube. Then, by screwing the nut 21 on the stem 20, to draw the pin 19 outwardly in the hub 11, the plug is expanded and will expand the tube 7 tightly in the opening in the sheet or wall 8. A temporary repair can thus be made, in case of an emergency, without putting the boiler out of service.

Having thus described the invention, what is claimed as new is:—

An emergency plug for stopping a leak between the end of a tube and a sheet through which the tube extends, comprising an annular rim to fit in said tube, a hub and spokes connecting said hub and rim, with openings between the spokes through which fluid may flow through the tube, said rim having an outstanding collar at its outer end formed with a grooved shoulder to fit over the beaded end of the tube, said rim, collar and hub being divided radially, said rim having a circumferential groove between the collar and the inner end of the rim, a circular spring in said groove, the hub having a circular hole therein tapering from the inner to the outer end of the hub, a tapered pin of circular cross-section fitted in said hole and having a screw-threaded stem at its outer end, and a nut threaded on said stem and bearing against the outer end of the hub.

In testimony whereof I hereunto affix my signature.

JESSE L. MEGATHLIN.